(12) United States Patent
Guering et al.

(10) Patent No.: US 7,669,798 B2
(45) Date of Patent: Mar. 2, 2010

(54) AIRPLANE PROTECTED AGAINST PROJECTIONS OF TIRE DEBRIS

(75) Inventors: Bernard Guering, Montrabe (FR); Jonathan Guering, Toulouse (FR)

(73) Assignee: Airbus France (FR)

( * ) Notice: Subject to any disclaimer, the term of this patent is extended or adjusted under 35 U.S.C. 154(b) by 197 days.

(21) Appl. No.: 11/774,135

(22) Filed: Jul. 6, 2007

(65) Prior Publication Data
US 2008/0006742 A1    Jan. 10, 2008

(51) Int. Cl.
*B64C 25/00* (2006.01)
(52) U.S. Cl. .............. 244/121; 244/103 R; 244/100 R; 280/851; 280/156
(58) Field of Classification Search ............. 244/121; 280/762, 770, 848, 847, 850, 851, 855, 156, 280/159, 160
See application file for complete search history.

(56) References Cited

U.S. PATENT DOCUMENTS

| 1,341,202 | A | * | 5/1920 | Strand | 244/103 R |
| 2,082,141 | A | * | 6/1937 | Beran | 280/855 |
| 2,501,886 | A | * | 3/1950 | Carlton | 280/855 |
| 2,509,807 | A | * | 5/1950 | Carlton | 280/855 |
| 2,571,285 | A | * | 10/1951 | Oehler | 280/856 |
| 2,782,053 | A | * | 2/1957 | Long | 280/851 |
| 3,254,766 | A | * | 6/1966 | Anderson | 209/245 |
| 3,544,370 | A | * | 12/1970 | Wrede | 134/37 |
| 3,670,996 | A | * | 6/1972 | Jenny | 244/103 R |
| 4,408,736 | A | * | 10/1983 | Kirschbaum et al. | 244/100 R |
| 5,058,827 | A | * | 10/1991 | Dansereau et al. | 244/103 R |
| 5,080,397 | A | * | 1/1992 | Metcalf | 280/851 |
| 5,890,452 | A | * | 4/1999 | Lundeen et al. | 119/167 |
| 6,845,943 | B2 | * | 1/2005 | Chambers et al. | 244/103 R |

FOREIGN PATENT DOCUMENTS

| DE | 20013599 U1 | 1/2002 |
| EP | 1016590 A1 | 7/2000 |

* cited by examiner

*Primary Examiner*—Michael R Mansen
*Assistant Examiner*—Justin Benedik
(74) *Attorney, Agent, or Firm*—Perman & Green LLP

(57) ABSTRACT

The tires that equip airplane wheels have elastomer treads from which a piece may detach and damage a zone of the airplane. Shredding means, situated between wheel and another part of the airplane, shred the piece of tread, which detaches from the tire and is projected onto the other part of the airplane, into several small pieces. These shredding means, such as a grid with blades that can cut the tread material, are arranged so as to disperse the pieces. A process reinforces the tolerance of an airplane to impacts of a detached piece of the tread, by shredding the piece into several small pieces between the instant when the piece is detached and the instant when the piece would have struck airplane.

18 Claims, 4 Drawing Sheets

Coupe AA

Coupe BB

Coupe = Section

AIRPLANE PROTECTED AGAINST PROJECTIONS OF TIRE DEBRIS

Figure 1A:
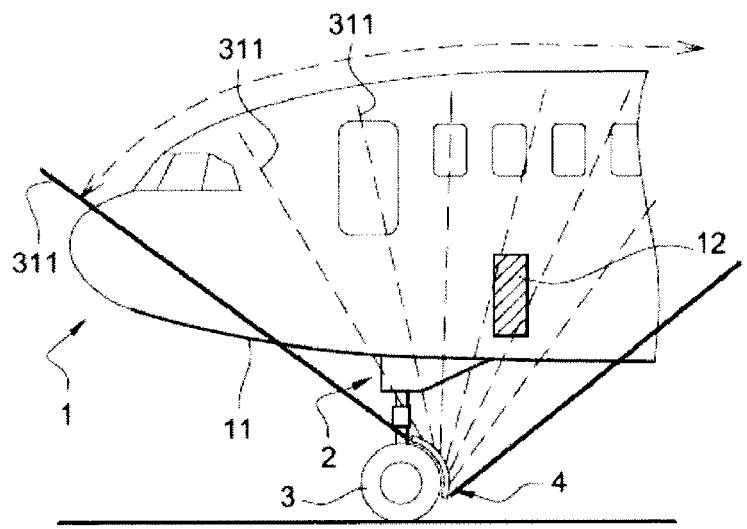
Figure 1B:
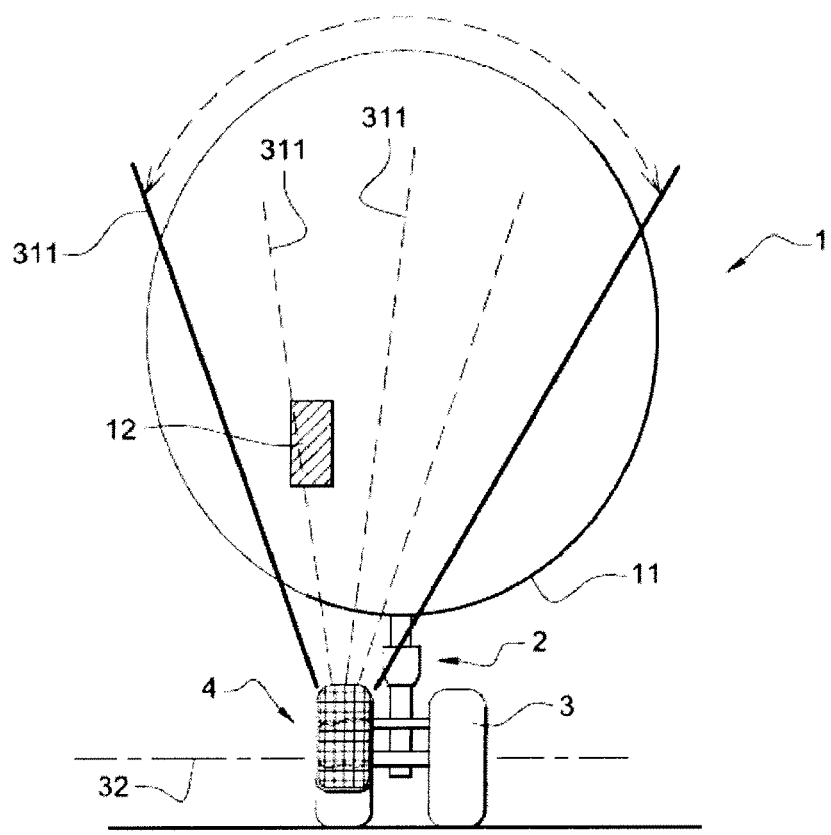

The disclosed embodiments relate to protecting an airplane against the consequences of the projection of high-energy tire debris. More particularly, the invention concerns means and a process for reducing the energy density of debris at the surface of airplane structures by fragmenting them and dispersing them before said debris can strike the airplane structure.

Airplane wheels are generally equipped with tires that have an elastomer tread. These tires, in particular for transport airplanes of a certain tonnage, such as medium-distance and long-distance civil planes, are subjected to very high stresses in normal use due to the load on the wheels and the speeds of rotation that come into play, corresponding to tangential speeds that can surpass 60 m/s.

Despite the quality of modern tires, it happens that, due to the effect of high stresses during rolling and/or under the influence of external causes, pieces of tread, called debris, are detached from a tire.

Most of the time, this occurrence does not have particular consequences and only requires replacing the damaged tire. In certain cases, the size and mass of a piece of debris detached from the tire are such that the energy of said piece of debris becomes critical with regard to parts of the airplane that may be situated in the trajectory of said piece, especially since said debris is most often detached when the wheel is in rapid rotation.

The damage incurred can be significant, for example:
deformation of metal structures,
delamination damage of composite-material structures,
perforations of the structure with damage to systems, some of whose functions may be altered,
perforations of fuel tanks with leaks.

In order to combat the consequences of this type of tire failure, a failure which cannot be completely avoided, airplane designers closely study possible trajectories and energies for tire debris that can be detached and define reinforced structures to stop said debris and/or arrangements of airplane systems that prevent the component assemblies, that assure the functioning of systems, from the risk of being damaged simultaneously, to the point of loss of functions essential to the safety of the airplane.

These solutions have been shown to be very restrictive, engendering penalties of mass due to zones of reinforced structures and also complicate the installation of systems in certain zones of the airplane, such as the electronics compartment, often near the front landing gear, and the hydraulics compartment, often near the principal landing gears.

The disclosed embodiments propose improving protection for an airplane subject to risk of impact by pieces of a tread detached from a degraded tire by reducing the energy density of said detached pieces at the surface of the airplane structures.

An airplane has one or more wheels equipped with tires, said tires bearing elastomer treads. According to the invention, the airplane has shredding means between at least one wheel and another part of the airplane which can shred a piece of tread into several pieces when said piece of the tread is detached from the tire of the at least one wheel and is projected toward said other part of the airplane.

Advantageously, in order to be able to intercept and shred all detached pieces of tread with shredding means that are as small as possible, said shredding means are situated near the wheel.

In order to assure that no piece of critical mass is projected onto the airplane structure, the shredding means are arranged so as to shred a detached piece of the tread as soon as the size of said piece is greater than a predefined size.

Advantageously, in order to shred the detached piece of tread into a multitude of small pieces, the shredding means comprise a series of blades that can slice the elastomer of said detached piece of the tread due to the speed of the detached piece itself.

In one embodiment, the shredding means can deflect the trajectories of the small pieces relative to an initial trajectory of the detached tread piece. The trajectories of the small pieces are deflected by angular orientations $\alpha$, $\beta$ of the blades, the value of the angular orientation $\alpha$ or $\beta$ of a blade being a function of the position of the blade considered relative to the wheel. Preferably, the values of angular orientations $\alpha$, $\beta$ vary continuously in order to disperse the small pieces over a wide impact surface of the airplane and thus distribute the energy density over said surface.

Advantageously, the maximum dimension of the small pieces, determined for each small piece by the shredding means, is a function of the angle under which the trajectory of the small piece considered is able to reach another part of the airplane and/or the resistance of the airplane at the susceptible points that can be reached.

In particular, blades of said shredding means are arranged according to a rectangular or diamond-shaped mesh.

In one preferred form of the disclosed embodiments, the shredding means are fastened roughly in a reference guide mark linked to an axis of rotation of the wheel and covering the tire over a zone of width and perimeter defined by a solid angle determined by the possible trajectories of the small pieces and the vulnerable surfaces of the airplane to be protected. Thus, only detached pieces of the tread that present a risk for the airplane are shredded.

In one embodiment, the shredding means have an additional blade, placed on one of its ends, that can shred the piece of tread that is in the process of detaching before its complete detachment from the tire, which permits beginning the shredding before the detached piece crosses the grid.

The disclosed embodiment also concern a process for reinforcing the tolerance of an airplane structure against impacts of a detached piece of a tire tread from a wheel of said airplane. The detached piece of tread is shred into several small pieces between the instant when said piece detaches itself from the tire and the instant when said piece would have struck the airplane structure.

According to the process, each small piece is deflected so that the trajectories of each of the small pieces diverge from one another to better distribute the energy of the small pieces over a sufficient surface of the structure, so as not to surpass the capacity of said structure to absorb energy without unacceptable damage.

Advantageously, in order to guarantee that the energy density over a surface of a structure that is likely to be impacted does not surpass a determined value, the size of each small piece is determined as a function of the maximum energy acceptable by the most vulnerable point of the structure by said small piece.

Figure 2:
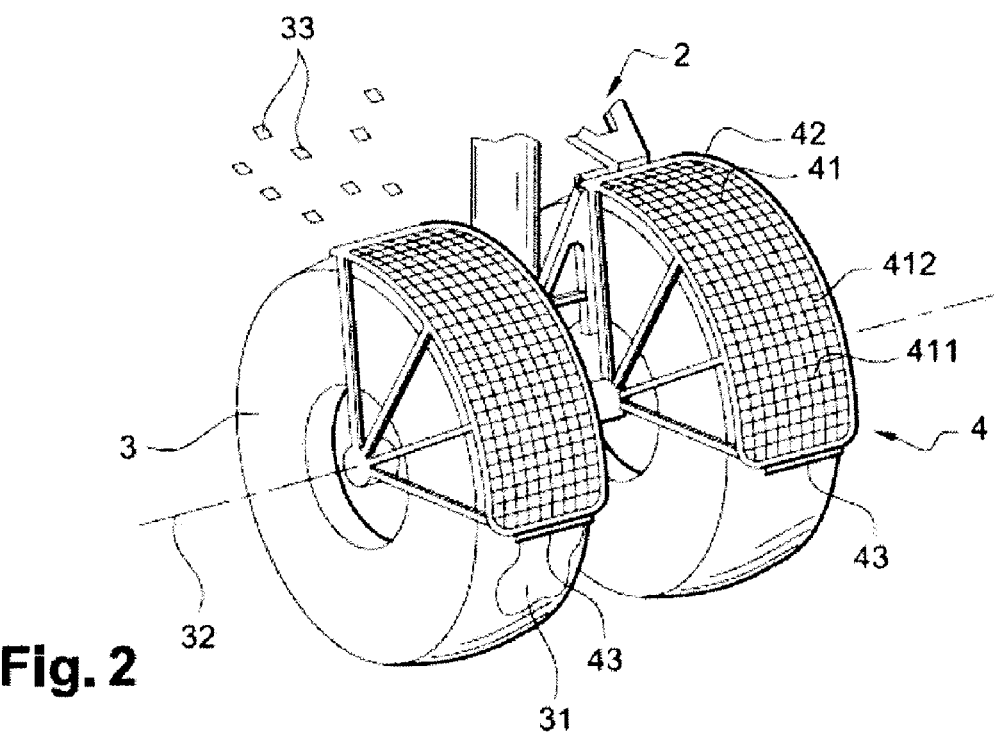
Figure 3:
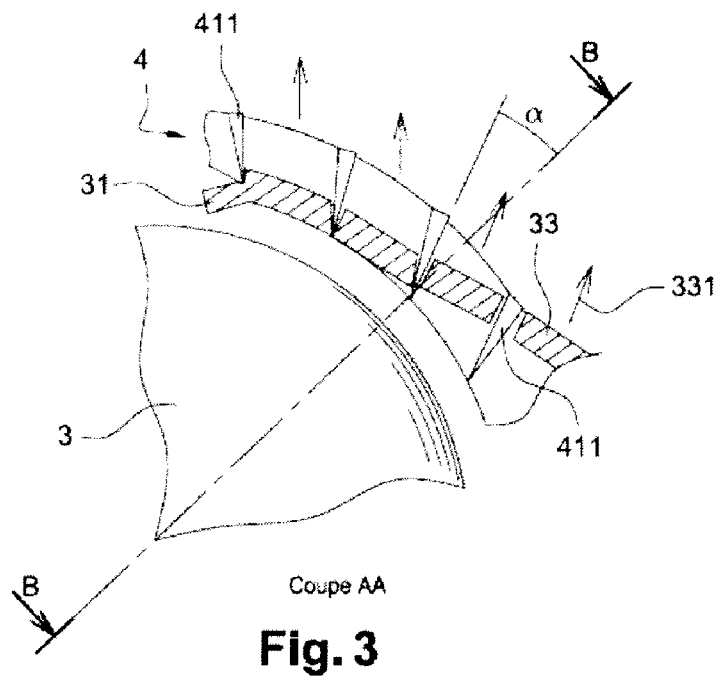

The detailed description of the aircraft is made in reference to the figures, which show:

FIG. 1a, b, c, different schematic views of a front zone of an airplane and a landing gear having a wheel equipped with means for shredding tire debris according to one embodiment, FIG. 2, a schematic view of a collection of wheels equipped with means for shredding tire debris according to one embodiment, FIG. 3, a partial schematic view, along a section roughly in a vertical plane following an axis of rotation of the wheel, of the shredding means used in the invention illustrating an example of the angular orientation of the blades parallel to the generating lines of the tire.

Figure 4:
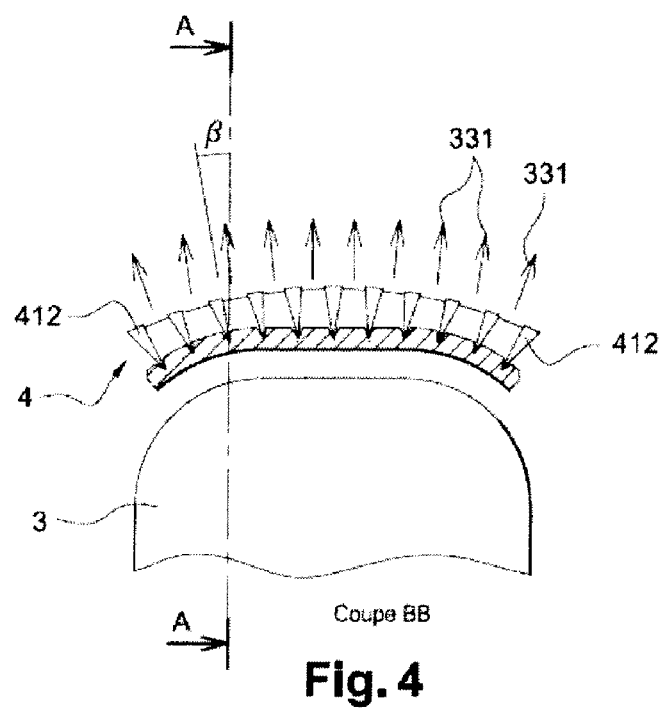

FIG. 4, a partial view, along a section roughly in a radial plane of the wheel, of the shredding means used in the invention illustrating an example of the angular orientation of the blades situated in a plane perpendicular to the generating lines following the curvature of the tire.

Figure 5:
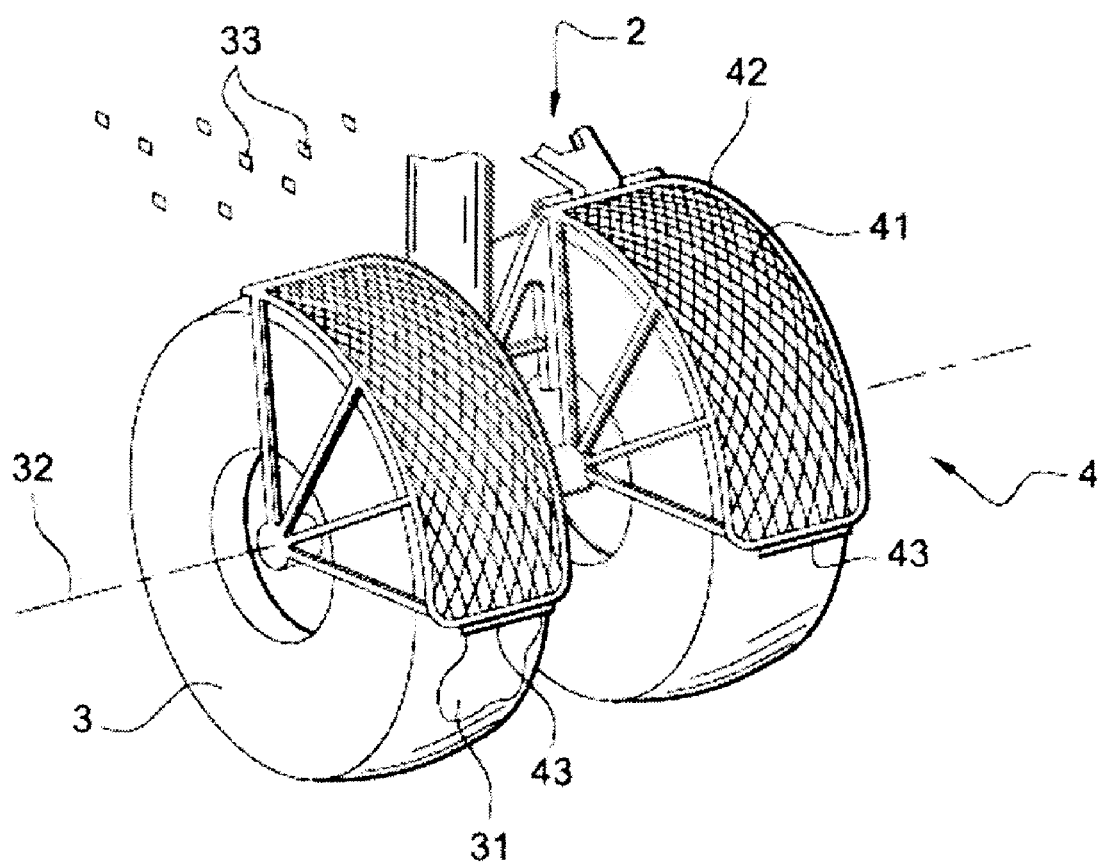

FIG. 5, a schematic view of a tire assembly equipped with means for shredding tire debris according to the invention, illustrating one example of arrangement of the blades of said shredding means.

An airplane 1 according to one embodiment has a landing gear 2 bearing one or more wheels 3. Each wheel turns around a stub axle fastened to the landing gear and is equipped with tires, said tires having elastomer treads.

The example of embodiment, which is illustrated in FIGS. 1a, b, c, is described in the case of a front landing gear of an airplane, but the invention is also applicable to all types of landing gear equipped with wheels and in particular to principal landing gears of the wings or fuselage.

Moreover, the airplane has shredding means 4 between at least one wheel 3 and another part of the plane, for example a structure 11, and, as illustrated in FIG. 2, these shredding means 4 comprise:

a cutting grid 41, of a width roughly equal to the width of the tire, having a curved shape in order to be roughly parallel to the tire, and covering a part of the wheel perimeter.

Means 42 for holding said grid.

Preferably, said means 42 are arranged so that grid 41 is roughly fixed in a reference guide mark connected to an axis of rotation 32 of wheel 3. For example, means 42 are fixed on either side of wheel 3: on one side, at an end of the stub axle bearing the wheel, and on the other side, on a hub of wheel 3.

Grid 41 has a double role. On the one hand, said grid breaks a piece of tread into small pieces 33 when said piece of tread, called debris 31, detaches from the tire of the at least one wheel 3 and is projected in the direction of structure 11 and/or systems 12 of airplane 1. On the other hand, said grid 41 deflects small pieces 33 resulting from the shredding of debris 31 along trajectories 331 relative to an initial trajectory 311 of debris 31 so as to disperse the collection of said small pieces 33 over a relatively broad area 15 of the plane and/or along a trajectory that does not impact structure 11 of airplane 1.

Advantageously, in order to shred debris 31 detached from the tire into many small pieces 33, grid 41 comprises a collection of cutting blades 411, 412 on the tire side, able to cut the elastomer of the debris under the effect of its own speed. Said cutting blades are, for example, made of stainless or carbon steel. By a choice fitted to the distances between blades 411, 412, grid 41 shreds all debris 31 whose size is greater than a predefined dimension. Thus, small pieces 33 that are projected in the direction of structure 11 of airplane 1 have a mass per unit much smaller than that of whole debris 31 and therefore a reduced individual impact energy relative to the impact energy of the whole debris when said small pieces strike said structure 11.

Due to their reduced size and their individual energy, small pieces 33, whose size and mass are variable, a priori, undergo a natural dispersion due to the aerodynamic flow speed (the detachment of debris 31 is generally associated with a high speed of the tire and therefore of airplane 1).

Figure 1C:
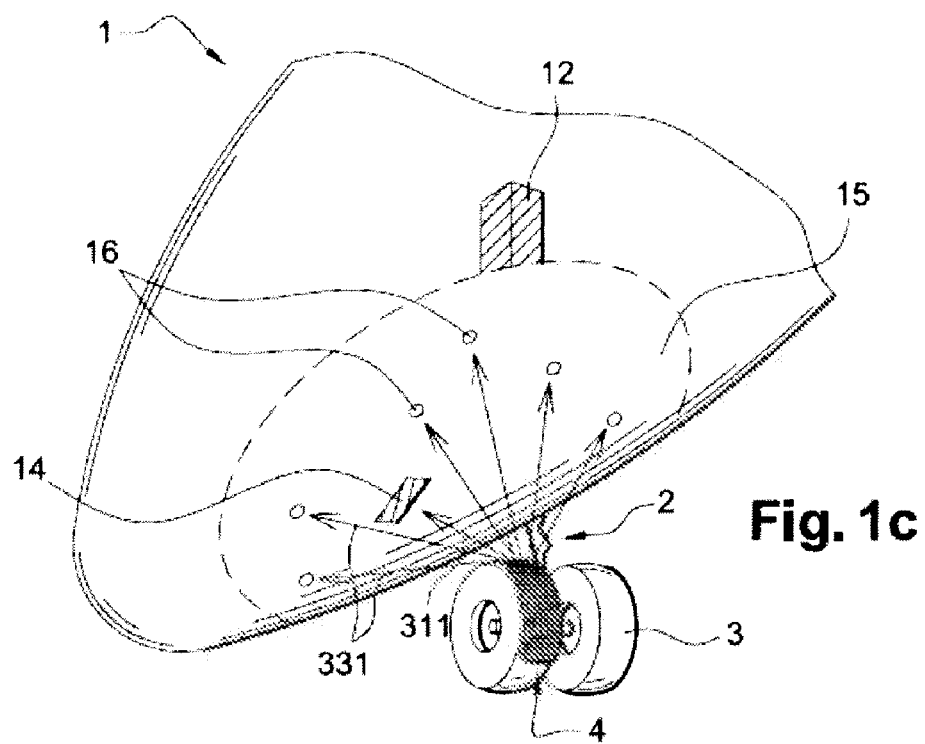

Due to this dispersion, small pieces 33, for those that reach structure 11 of airplane 1, will strike the surface of structure 11 in different, more or less distant, impact points 16, and as a result, the total energy of debris 31 will be distributed over a much larger surface area 15, visualized by the closed curve shown by the dashed line of FIG. 1c. As a result of the reduction of the surface energy density on structure 11, said surface is much less vulnerable and does not require reinforcement, or at least requires much more limited reinforcement.

Advantageously, in order to increase the deviations of trajectories 331 of small pieces 33 relative to the initial trajectory 311 of debris 31 and obtain a more effective dispersion of small pieces 33 at the level of the impact surface 15 on structure 11 of airplane 1, each blade 411, 412 has a predefined and distinct orientation of neighboring blades so that trajectories 331 constitute a divergent cone. It is thus possible to guarantee that the energy density on surface 15 of structure 11 of airplane 1 does not surpass a determined value.

In one preferred embodiment, blades 411, 412 are arranged according to a network of a roughly rectangular mesh. A first series of blades 411 is parallel to the generating lines of the rolling surface of the tire and roughly straight. A second series of blades 412 is in a plane perpendicular to the generating lines following the curvature of the rolling surface of the tire.

Blades 411, parallel to the tire generating lines, have an angular orientation $\alpha$ relative to the radius of the tire in which blade 411 is situated, as illustrated in FIG. 3. This angular orientation $\alpha$ can be variable according to the blade considered, but in practice said angular orientation can be roughly constant due to the natural radial dispersion.

Blades 412 situated in a plane perpendicular to the generating lines along the curvature of the tire have an angular orientation $\beta$ relative to a plane perpendicular to axis of rotation 32 of wheel 3, as illustrated in FIG. 4. The angular orientation $\beta$ of each blade 412 is a function of the distance of the blade relative to a reference plane (not shown) perpendicular to axis of rotation 32 of wheel 3. Each angular orientation varies relatively continuously so as to disperse small pieces 33 along divergent trajectories after crossing grid 41, and thus obtaining a broader impact surface 15 on structure 11 of airplane 1 than a surface 14 impacted by whole debris 31. Preferably, in order to limit the value of angular orientation $\beta$ while preserving a satisfactory dispersion, blades 412 are orientated roughly symmetrically with regard to the perpendicular plane situated at the middle of the tire width.

The space between blades 411, 412 determines the sizes of small pieces 33 resulting from shredding debris 31. This spacing is determined as a function of the acceptable maximum energy, therefore mass, of a small piece 33 crossing the grid at the place considered. This acceptable energy and mass are directly linked to the structural resistance of surface area 15 that may be impacted by the small piece 33 considered, as well as by the angle under which the trajectory 331 of said small piece is likely to reach surface 15 of structure 11 of airplane 1. Blades 411, 412 are therefore positioned more closely together at the more vulnerable parts of surface 15 of structure 11 of airplane 1 that are likely to be touched by projected small pieces 33.

The disclosed embodiments are not limited to an arrangement of blades 411, 412 according to a network of rectangular mesh, as in the illustrations of FIGS. 1b to 4. Other arrangements, for example an arrangement of said blades according to a network of diamond-shaped mesh, as illustrated in FIG. 5, can also be used. The person skilled in the art will be able to adapt the invention to arrangements of blades that have not been described.

Advantageously, cutting grid 41 covers the tire over an area, in width and perimeter, such that only debris 31 having a risk of damaging airplane 1 is cut into small pieces 33. Such a zone is defined by a solid angle determined by possible trajectories 311 of debris 31 and the vulnerable surfaces of airplane 1 to be protected.

Preferably, shredding means 4 are situated near wheel 3. This choice of positioning said shredding means near said wheel permits, on the one hand, intercepting debris 31 with a grid 41 of smaller size, and, on the other hand, dispersing small pieces 33 resulting from the shredding of debris 31 over a maximum impact surface 15 of the airplane by an extension of their trajectory 331 between grid 41 and their impact points 16 on the structure of the airplane.

Advantageously, shredding means 4 are made of a strong material in order to resist consecutive detachments of several pieces of debris 31 from a tire during an event such as, for example, the blow-out of a tire during take off. It is nevertheless not indispensable that shredding means 4 are intact after the event, since wheel 3 must then imperatively be replaced and shredding means 4 removed.

In one embodiment, shredding means 4 have an additional blade 43, preferably not straight, positioned on one end of means 42, of the rear side in the direction of movement of wheel 3. Said additional blade permits partially shredding debris 31 in the process of detaching before it is completely detached from the tire and limiting the size and mass of debris 31 before being shredded after its complete detachment.

The disclosed embodiments also concern a process for reinforcing the tolerance of an airplane 1 to the impact of debris 31 from a tire consisting of shredding debris 31 into several small pieces 33 between the instant when said debris is detached from the tire and the instant when said debris would have impacted a structure 11 of airplane 1. According to the process, advantageously, small pieces 33 resulting from shredding debris 31 are deflected along different trajectories 331 to avoid structure 11 of airplane 1 and/or to distribute the impact energy of small pieces 33 over a sufficient surface 15 of structure 11 to remain below a tolerable threshold for impact energy surface density.

The disclosed embodiment therefore permit obtaining an airplane whose protection of structure 11 and systems 12 is improved against projections of debris 31 from damaged wheels 3 by the shredding and dispersion of said debris 31.

The invention claimed is:

1. An airplane having one or more wheels equipped with tires, said tires having elastomer treads, wherein said airplane comprises shredding means between at least one wheel and another part of the plane, the shredding means comprise a plurality of spaced-apart cutting blades arranged in a crisscross mesh pattern angled relative to the tire of the at least one wheel to cut a piece of tread into several small pieces upon a detachment of said piece of tread from the tire of the at least one wheel and its projection towards said other part of the airplane.

2. The airplane according to claim 1 in which shredding means are situated near wheel.

3. The airplane according to claim 1 in which shredding means shred pieces of tread detached from the tire whose size is greater than a predefined size.

4. The airplane according to claim 1 in which shredding means comprise a series of blades that can cut the elastomer of the detached piece of the tire tread under the effect of said detached piece's own speed.

5. The airplane according to claim 1 in which shredding means are able to deflect trajectories of small pieces relative to an initial trajectory of detached part of the tire tread.

6. The airplane according to claim 5 in which trajectories of small pieces are deflected by predetermined angular orientations $\alpha$, $\beta$ of blades.

7. The airplane according to claim 6 in which the value of angular orientation $\alpha$ or $\beta$ of a blade is a function of the position of blade considered relative to wheel.

8. The airplane according to claim 6 in which the value of angular orientation $\alpha$, $\beta$ varies continuously in order to be able to disperse small pieces over a broad impact surface of the airplane.

9. The airplane according to claim 1 in which the maximum dimension of small pieces, determined for each small piece by the shredding means, is a function of the angle under which trajectory of the small piece considered is able to reach the other part of the airplanes and the resistance of airplane at the points that can be reached.

10. The airplane according to claim 1 in which blades of shredding means are arranged according to a rectangular mesh network.

11. The airplane according claim 1 in which blades of shredding means are arranged according to a diamond-shaped mesh network.

12. The airplane according to claim 1 in which shredding means are fixed in a reference guide mark linked to an axis of rotation of wheel.

13. The airplane according to claim 1 in which shredding means cover the tire over a zone defined in width and in perimeter by a solid angle determined by possible trajectories of detached parts of the tread and vulnerable surfaces of airplane to be protected.

14. The airplane according to claim 1 in which shredding means have an additional blade, positioned on one of its ends, in order to shred the piece of the tread in the process of its detaching before it is completely detached from the tire.

15. A process for reinforcing the tolerance of a structure of an airplane to the impact of pieces of a tread detached from a tire of a wheel of said airplane consisting of shredding detached parts of the tread, by means of a shredding means comprising a plurality of spaced-apart cutting blades arranged in a crisscross mesh pattern, into several small pieces between the instant when said piece detaches from the tire and the instant when said piece would have struck structure of the airplane.

16. The process according to claim 15 in which each small piece is deflected so that the trajectories of each of said small pieces diverge from one another.

17. The process according to claim 15, in which small pieces are deflected so as to distribute the energy of the small pieces over a surface of structure sufficient so as not to surpass the capacity of said structure for absorbing energy without unacceptable damage.

18. The process according to claim 15, in which the size of each small piece is a function of the maximum acceptable energy by the most vulnerable point of structure that can be impacted by the small pieces.

* * * * *

UNITED STATES PATENT AND TRADEMARK OFFICE
CERTIFICATE OF CORRECTION

PATENT NO. : 7,669,798 B2  Page 1 of 1
APPLICATION NO. : 11/774135
DATED : March 2, 2010
INVENTOR(S) : Guering et al.

It is certified that error appears in the above-identified patent and that said Letters Patent is hereby corrected as shown below:

On Title Page, column 1, insert --(30) Foreign Applicant Priority Data July 6, 2006 (FR) 06 52881--

In Claim 9, column 6, line 18, delete "airplanes" and insert --airplane--, therefor.

Signed and Sealed this

Sixteenth Day of November, 2010

David J. Kappos
*Director of the United States Patent and Trademark Office*